United States Patent
Chang et al.

(10) Patent No.: US 9,171,572 B1
(45) Date of Patent: Oct. 27, 2015

(54) MULTI-DIMENSIONAL OPTIMIZATION OF READ CHANNEL

(71) Applicant: LSI Corporation, San Jose, CA (US)

(72) Inventors: Wu Chang, Sunnyvale, CA (US); Parviz Rahgozar, Cupertino, CA (US); Ming Jin, Fremont, CA (US); Haitao Xia, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/278,188

(22) Filed: May 15, 2014

Related U.S. Application Data

(60) Provisional application No. 61/989,154, filed on May 6, 2014.

(51) Int. Cl.
*G11B 5/09* (2006.01)
*G11B 20/10* (2006.01)

(52) U.S. Cl.
CPC .............................. *G11B 20/10509* (2013.01)

(58) Field of Classification Search
CPC ................ G11B 20/1426; G11B 5/09; G11B 20/10009; G11B 27/3027; G11B 2220/90; G11B 5/012; G11B 5/00; G11B 27/36; H04N 7/50; H04N 7/26085; H04N 7/30; H04N 1/4052; H04N 1/4053; G05B 13/042; G05B 13/048; G05B 13/02
USPC ................. 360/29, 31, 39, 40, 48, 53, 55, 65; 382/251, 253; 700/33, 32; 375/240.01
See application file for complete search history.

(56) References Cited

U.S. PATENT DOCUMENTS

| 7,139,142 B2 | 11/2006 | Berman et al. |
| 7,328,138 B1 | 2/2008 | Trabert et al. |
| 8,831,089 B1 * | 9/2014 | Zhang ..................... 375/240.01 |

OTHER PUBLICATIONS

Wright, Margaret H., "Nelder, Mead, and the Other Simplex Method", Documenta Mathematica, Extra Volume ISMP (2012), pp. 271-276.

* cited by examiner

*Primary Examiner* — Nabil Hindi
(74) *Attorney, Agent, or Firm* — Suiter Swantz pc llo

(57) ABSTRACT

Variations of the Nelder-Mead direct search method are employed to find read channel parameter settings in a discrete field having three or more dimensions. The three or more dimensions correspond to read channel parameters, at least some of which are highly correlated. The steps of the Nelder-Mead method are executed according to a methodology to arrive at substantially optimal parameter settings for a read channel, even where a discrete function defining parameter outcomes is noisy. In some embodiments, dimensional collapse, considered inefficient in a two-dimensional field, is allowed in order to reach an optimal solution in a greater-than-two-dimensional field.

20 Claims, 7 Drawing Sheets

MULTI-DIMENSIONAL OPTIMIZATION OF READ CHANNEL

PRIORITY

The present application claims the benefit under 35 U.S.C. §119(e) of U.S. Provisional Application Ser. No. 61/989,154, filed May 6, 2014, which is incorporated herein by reference.

BACKGROUND OF THE INVENTION

Data storage device read channels have many parameters that require optimization. Interleaved one-dimensional sweeps and, to a lesser extent, limited two-dimensional sweeps are currently used to optimize read channels but an exhaustive sweep of parameters which are strongly correlated would be prohibitive. Better read channel optimization could be achieved if more parameters could be considered during optimization. Furthermore, noisy functions defining parameter values can produce sub-optimal results during a sweep.

Consequently, it would be advantageous if an apparatus existed that is suitable for multi-dimensional optimization of read channel parameters by non-linear search.

SUMMARY OF THE INVENTION

Accordingly, the present invention is directed to a novel method and apparatus for multi-dimensional optimization of read channel parameters by non-linear search.

In at least one embodiment of the present invention, variations of the Nelder-Mead direct search method are employed to find read channel parameter settings in a discrete field having three or more dimensions. The three or more dimensions correspond to read channel parameters, at least some of which are highly correlated.

The steps of the Nelder-Mead method are executed according to a methodology of one or more embodiments of the present invention to arrive at substantially optimal parameter settings for a read channel, even where a discrete function defining parameter outcomes is noisy. In some embodiments, dimensional collapse, considered inefficient in a two-dimensional field, is allowed in order to reach an optimal solution in a greater-than-two-dimensional field.

Optimization according to embodiments of the present invention is more efficient with fewer steps than the prior art. Furthermore, in some cases, embodiments of the present invention arrive at superior channel settings as compared to the prior art.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
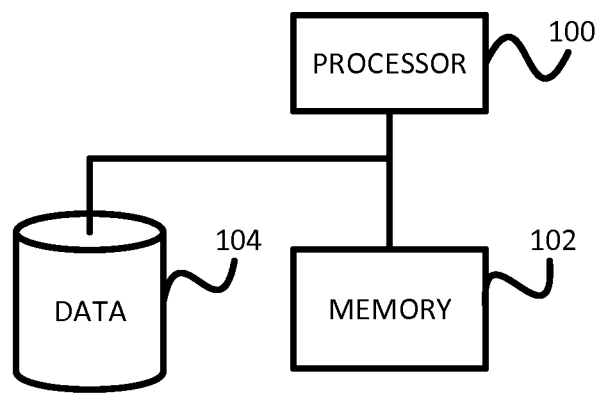
FIG. 1 shows a block diagram of a data storage system useful for implementing embodiments of the present invention.

Referring to FIG. 1, a block diagram of a data storage system useful for implementing embodiments of the present invention is shown. The storage system comprises a data storage element 104 connected to a processor 100. The processor 100 executes computer executable program code stored in a memory 102 connected to the processor 100. The computer executable program code configures the processor 100 to optimize read channels to the data storage element 104 according to embodiments of the present invention as described more fully herein.

Figure 2:
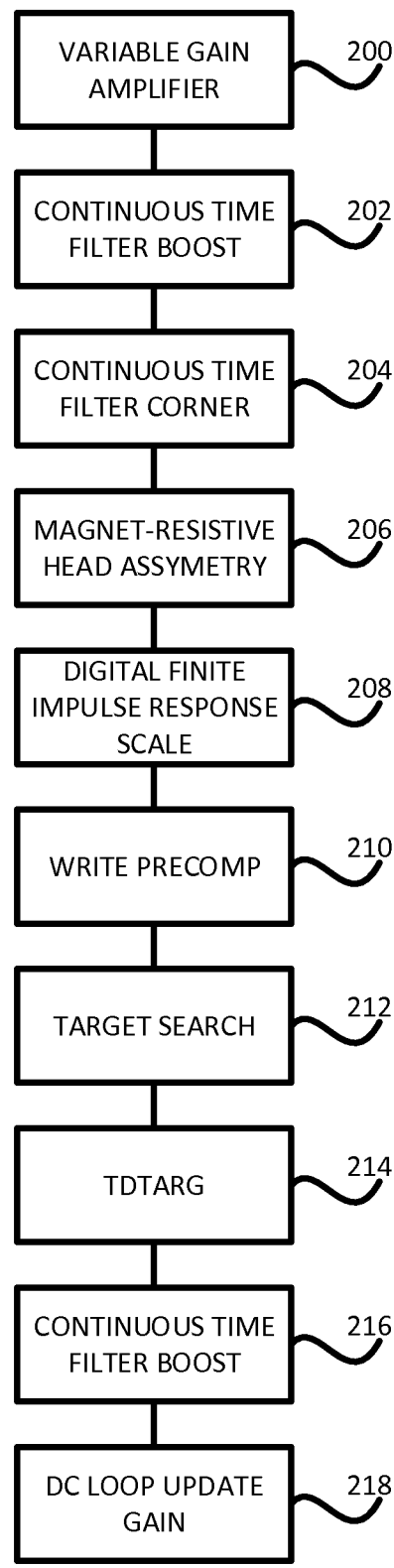
FIG. 2 shows a flowchart of channel optimization steps.

Referring to FIG. 2, a flowchart of channel optimization steps is shown. Read channels may be optimized by first optimizing the gain 200 of a variable gain amplifier, then the boost 202 and corner 204 of a continuous time filter, then any asymmetry 206 in the magneto-resistive head, then the scale 208 of digital finite impulse response, then a write precomp 210 control value and a target search 212 value, then TDT arguments 214. After various parameters are optimized in a sweep, it is often necessary to re-optimize previous parameters within new constraints. Therefore, the boost 216 of the continuous time filter is re-optimized. Then any remaining parameters, such as DC loop update gain 218, are optimized. Such sweeps are resource intensive. Multiple sweeps to optimize all values would be prohibitive.

Referring to FIGS. 3A-3E, visual representations of reflection, expansion, outer contraction, inner contraction and shrink processes executed according to embodiments of the Nelder-Mead method are shown. Nelder-Mead utilizes simple rules to find optimal values in a discrete field without gradient computations.

In the Nelder-Mead method, a set of vertices in the field are organized according to a value defined by a discrete function.

At each step, the worst vertex is replaced with a new vertex. The potential steps are illustrated.

Figure 3A:
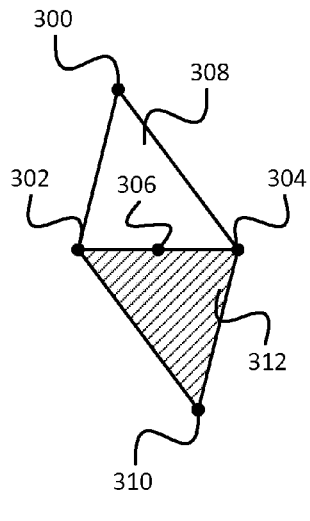
FIG. 3A shows a visual representation of a reflection processes executed according to the Nelder-Mead method.

FIG. 3A shows a representation of a reflection step where an initial field portion 308 is defined by a first vertex 300, a second vertex 302, a third vertex 304 and a fourth vertex 306. The first vertex 300 being the worst as defined by a discrete function; a reflection vertex 310 of the first vertex 300, and a corresponding discrete function value, are calculated. The reflection vertex 310 and the remaining vertices 302, 304, 306 define a reflection field portion 312.

Figure 3B:
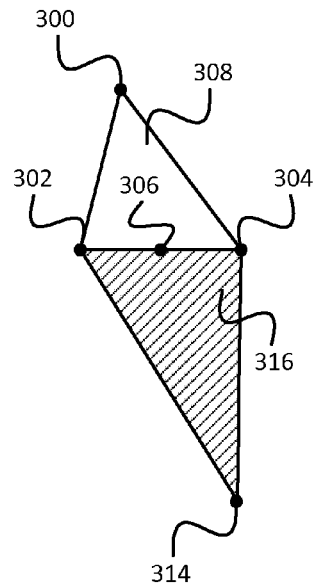
FIG. 3B shows a visual representation of a expansion processes executed according to the Nelder-Mead method.

FIG. 3B shows a representation of an expansion step where an initial field portion 308 is defined by the first vertex 300, the second vertex 302, the third vertex 304 and the fourth vertex 306. The first vertex 300 being the worst as defined by a discrete function; an expansion vertex 314 of the first vertex 300, and a corresponding discrete function value, are calculated. The expansion vertex 314 and the remaining vertices 302, 304, 306 define an expansion field portion 316.

Figure 3C:
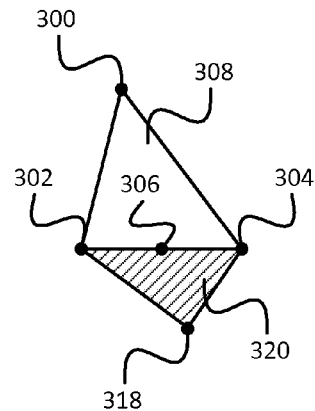
FIG. 3C shows a visual representation of an outer contraction processes executed according to the Nelder-Mead method.

FIG. 3C shows a representation of an outer contraction step where an initial field portion 308 is defined by the first vertex 300, the second vertex 302, the third vertex 304 and the fourth vertex 306. The first vertex 300 being the worst as defined by a discrete function; an outer contraction vertex 318 of the first vertex 300, and a corresponding discrete function value, are calculated. The outer contraction vertex 318 and the remaining vertices 302, 304, 306 define an outer contraction field portion 320.

Figure 3D:
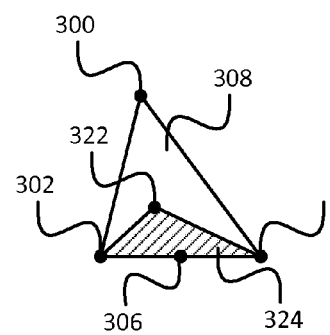
FIG. 3D shows a visual representation of an inner contraction processes executed according to the Nelder-Mead method.

FIG. 3D shows a representation of an inner contraction step where an initial field portion 308 is defined by the first vertex 300, the second vertex 302, the third vertex 304 and the fourth vertex 306. The first vertex 300 being the worst as defined by a discrete function; an inner contraction vertex 322 of the first vertex 300, and a corresponding discrete function value, are calculated. The inner contraction vertex 322 and the remaining vertices 302, 304, 306 define an inner contraction field portion 324.

Figure 3E:
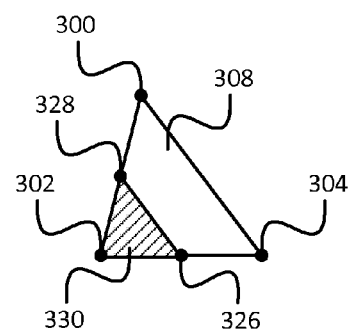
FIG. 3E shows a visual representation of a shrink processes executed according to the Nelder-Mead method.

FIG. 3E shows a representation of a shrink or reduction step where an initial field portion 308 is defined by the first vertex 300, the second vertex 302, the third vertex 304 and the fourth vertex 306. The first vertex 300 being the worst as defined by a discrete function, but contracting away from the first vertex 300 leading to even worse discrete function values; only the best vertex, in this case the second vertex 302, is retained and a reduced field portion 330 is defined by the second vertex 302 and new shrunken vertices 326, 328.

The steps described in FIGS. 3A-3E generally occur in a particular order to arrive at a desirable, substantially optimal function value in a two-dimensional field.

Figure 4:
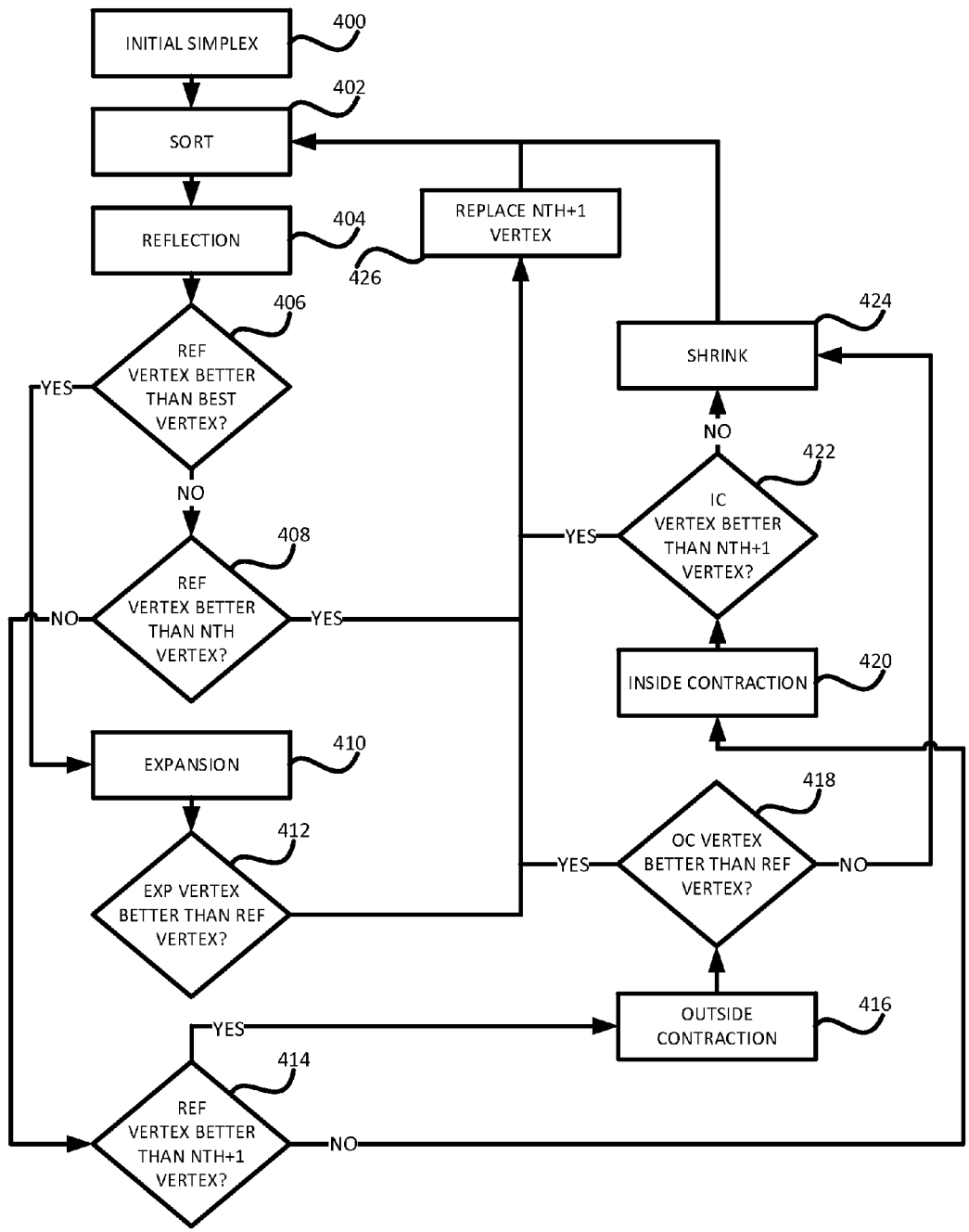
FIG. 4 shows a flowchart of a Nelder-Mead method implementation.

Referring to FIG. 4, a flowchart of a Nelder-Mead method implementation is shown. A computer system that utilized the Nelder-Mead method for optimizing read channel parameters without modification would establish 400 an initial simplex of vertexes, each vertex selected at random in a multi-dimensional field. The initial simplex of vertexes would be sorted 402 according to the relative multi-parameter function value of the vertexes. Once the vertexes are sorted 402, the computer system would produce a reflection vertex 404 to replace the vertex having the worst performance and determine 406 if the reflection vertex has better performance than the best performing vertex in the simplex. If the reflection vertex has superior performance to the best vertex, the computer system would produce an expansion vertex 410 and determine 412 if the expansion vertex is better than the reflection vertex. If the expansion vertex is superior, the worst vertex would be replaced 426 by the expansion vertex, otherwise the worst vertex would be replaced 426 by the reflection vertex.

If the reflection vertex has worse performance than the best vertex, the computer system would determine 408 if the reflection vertex has better performance than the $n^{th}$ vertex. If so, the worst vertex ($n^{th}$+1) would be replaced 426 by the reflection vertex, otherwise the computer system would determine 414 if the reflection vertex is better than the worst vertex.

If it is determined 414 that the reflection vertex is better than the worst vertex, the computer system would produce an outside contraction vertex 416 and determine 418 if the outside contraction vertex is better than the reflection vertex. If the outside contraction vertex is superior, the worst vertex would be replaced 426 by the outside contraction vertex, otherwise the observed field is shrunk 424 by replacing all but one vertex. The computer system would then re-sort 402 the vertexes and starts over.

If it is determined 414 that the reflection vertex is worse than the worst vertex, the computer system would produce an inside contraction vertex 420 and determines 422 if the inside contraction vertex is better than the worst vertex. If the inside contraction vertex is superior, the worst vertex would be replaced 426 by the inside contraction vertex, otherwise the observed field is shrunk 424 by replacing all but one vertex. The computer system then re-sorts 402 the vertexes and starts over.

A person skilled in the art may appreciate that utilizing the Nelder-Mead method for multi-dimensional read channel optimization without modification is likely to produce sub optimal results. For example, in multi-dimensional optimization, dimensional collapse may be desirable.

Figure 5:
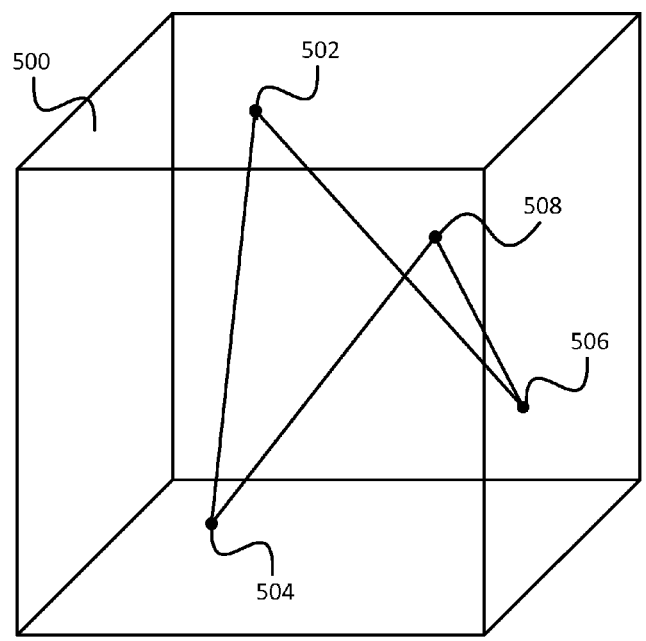
FIG. 5 shows a perspective view of a three-dimensional field representing a function space corresponding to multiple dimensions of channel optimization parameters.

Referring to FIG. 5, a perspective view of a three-dimensional field 500 representing a function space corresponding to multiple dimensions of channel optimization parameters is shown. The three-dimensional field 500 includes a plurality of randomly selected vertexes 502, 504, 506, 508. The function space of the three-dimensional field 500 corresponds to a discrete, continuous read channel function correlating multiple read channel parameters into a read channel performance. Such read channel functions are often noisy. Embodiments according to the present invention are operative even for noisy read channel functions.

The initial randomly selected vertexes 502, 504, 506, 508 are selected to be sufficiently widely spaced so as to allow vertexes 502, 504, 506, 508 to be removed and replaced to arrive at a substantially optimal performance.

Figure 6A:
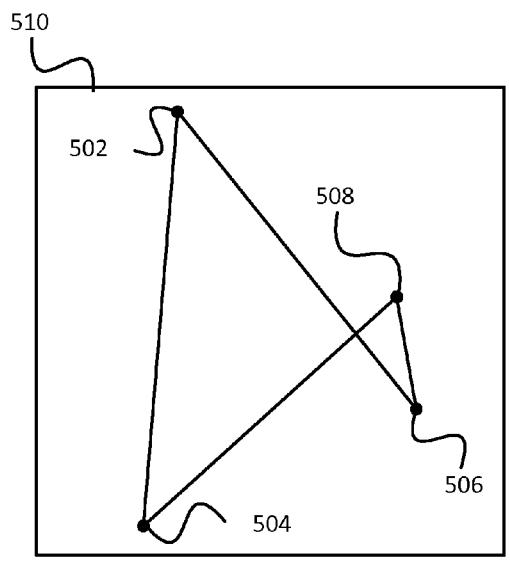
FIG. 6A shows a first side view, two-dimensional projection of the three-dimensional space of FIG. 5.
Figure 6B:
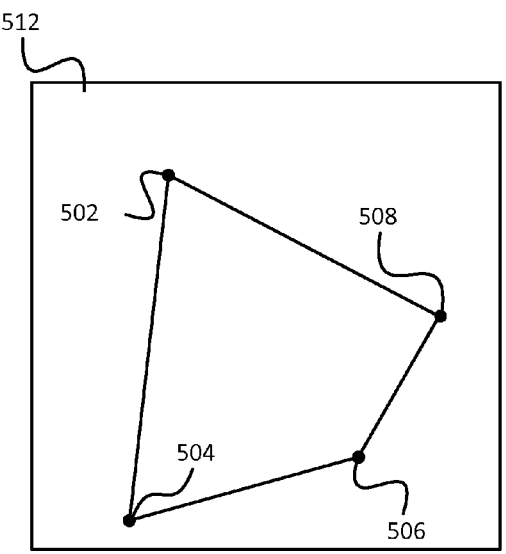
FIG. 6B shows a top view, two-dimensional projection of the three-dimensional space of FIG. 5.
Figure 6C:
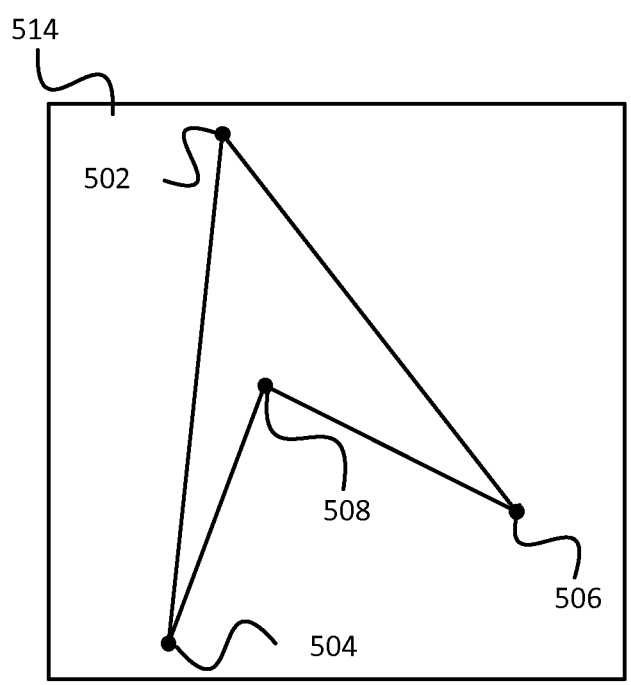
FIG. 6C shows a second side view, two-dimensional projection of the three-dimensional space of FIG. 5.

Referring to FIGS. 6A-6C, two-dimensional projections of the three-dimensional space of FIG. 5 are shown. FIG. 6A shows a side view, two-dimensional projection of the three-dimensional field of FIG. 5; FIG. 6B shows top view, two-dimensional projection of the three-dimensional field of FIG. 5; and FIG. 6C shows another side view, two-dimensional projection of the three-dimensional field of FIG. 5. The methods described herein are generally performed on two dimensional projections of higher dimensional field spaces such as the three-dimensional field of FIG. 5. Where variants of the Nelder-Mead method are used according to the present invention, vertexes 502, 504, 506, 508 in a multi-dimensional field are sometimes replaced so as to allow dimensional collapse wherein some vertexes fail a collinear test in one two-dimensional projection to allow continued advancement of the search process.

Figure 7:
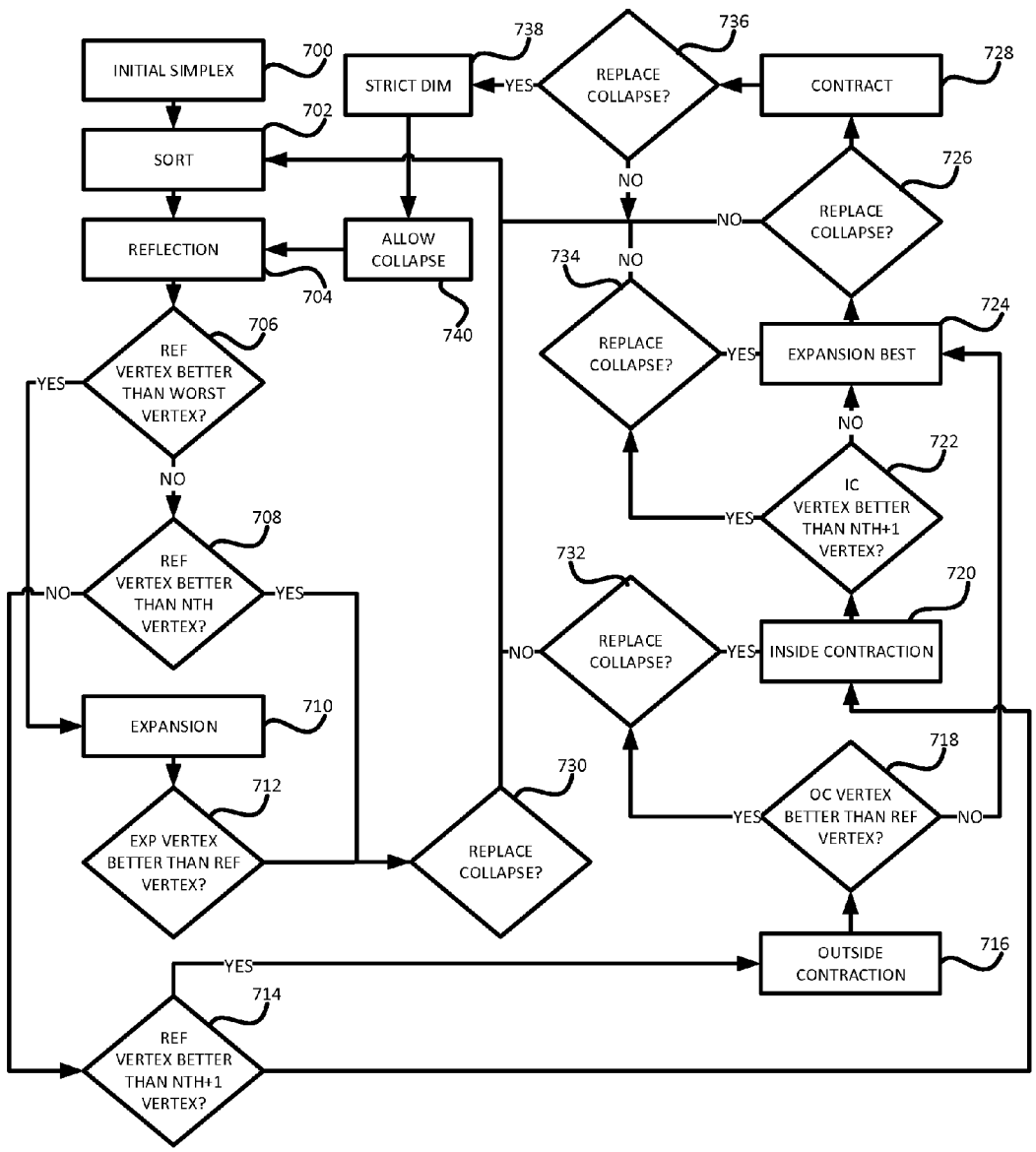
FIG. 7 shows a flowchart of another method according to at least one embodiment of the present invention.

Referring to FIG. 7, a flowchart of another method according to at least one embodiment of the present invention is shown. In at least one embodiment, a computer system for optimizing read channel parameters establishes 700 an initial simplex of vertexes, each vertex selected at random in a multi-dimensional field. In the context of the present invention, a computer system may comprise a processor and firmware in a data storage device. The multi-dimensional field comprises discrete values defined by a multi-parameter function. Various of the multiple parameters are correlated. The initial simplex of vertexes should define a sufficiently large portion of the multi-dimensional field to capture an optimal value and allow latitude for manipulation of the simplex of vertexes without collapsing certain dimensions of the simplex.

The initial simplex of vertexes is sorted 702 according to the relative multi-parameter function value of the vertexes. The multi-parameter function value defines the performance of the read channel at discrete, continuous multi-parameter values. Once the vertexes are sorted 702, the computer system produces a reflection vertex 704 to replace the vertex having the worst performance. The reflection vertex in a system of n+1 vertexes is defined by:

$$x_r = 1/n(\text{sum}(x_i)) + \alpha(1/n(\text{sum}(x_i)) - x_{n+1})$$

The computer system then determines 706 if the reflection vertex has better performance than the best performing vertex in the simplex. If the reflection vertex has superior performance to the best vertex, the computer system produces an expansion vertex 710. In at least one embodiment, the expansion vertex is defined by:

$$x_e = 1/n(\text{sum}(x_i)) + \beta(x_r - 1/n(\text{sum}(x_i)))$$

The computer system then determines 712 if the expansion vertex is better than the reflection vertex. If the expansion vertex is superior, and if the computer system determines 730 replacing the worst vertex will not cause dimensional collapse, the worst vertex is replaced by the expansion vertex, otherwise, if the computer system determines 730 replacing the worst vertex will not cause dimensional collapse, the worst vertex is replaced by the reflection vertex.

If the reflection vertex has worse performance than the best vertex, the computer system determines 708 if the reflection vertex has better performance than the $n^{th}$ vertex. If so, and if the computer system determines 730 replacing the worst vertex will not cause dimensional collapse, the worst vertex ($n^{th}+1$) is replaced by the reflection vertex, otherwise the computer system determines 714 if the reflection vertex is better than the worst vertex.

If it is determined 714 that the reflection vertex is better than the worst vertex, the computer system produces an outside contraction vertex 716. In at least one embodiment, the outside contraction vertex is defined by:

$$x_{oc} = 1/n(\text{sum}(x_i)) + \gamma(x_r - 1/n(\text{sum}(x_i)))$$

The computer system then determines 718 if the outside contraction vertex is better than the reflection vertex. If the outside contraction vertex is superior, and if the computer system determines 732 replacing the worst vertex will not cause dimensional collapse, the worst vertex is replaced by the outside contraction vertex.

If it is determined 714 that the reflection vertex is worse than the worst vertex, or replacing 732 the worst vertex with the outside contraction vertex causes dimensional collapse, the computer system produces an inside contraction vertex 720. In at least one embodiment, the outside contraction vertex is defined by:

$$x_{ic} = 1/n(\text{sum}(x_i)) - \gamma(x_r - 1/n(\text{sum}(x_i)))$$

The computer system then determines 722 if the inside contraction vertex is better than the worst vertex. If the inside contraction vertex is superior, and if the computer system determines 734 replacing the worst vertex will not cause dimensional collapse, the worst vertex is replaced by the inside contraction vertex.

If the inside contraction vertex is not better than the worst vertex, the inside contraction would cause dimensional collapse or the outside contraction vertex is not better than the reflection vertex, the best vertex is expanded 724. If expanding 724 the best vertex does not cause dimensional collapse 726, the vertexes are re-sorted and the process continues. If expansion 724 does cause dimensional collapse, the observed field is contracted 728. If contraction 728 does not cause dimensional collapse 736, the contracted vertexes are re-sorted and the process continues. If contraction 728 does cause dimensional collapse 736, strict dimensional constraint 738 is employed, as compared to loose dimensional constraint, and dimensional collapse is allowed 740. The process then continues with the worst vertex being reflected 704. Loose dimensional constraint enforces a collinear criteria in each two dimensional projection; strict dimensional constraint enforces a collinear criteria only in each pair of two dimensional projections.

Scaling factors α, β, γ, depend on certain factors of the multi-dimensional field. In at least one embodiment, {α, β, γ}={1, 2, ½} by default.

Dimensional collapse restrains the availability of certain parameters to be varied going forward, so dimensional collapse is generally undesirable. However, in a greater than two-dimensional field, dimensional collapse allows the process to continue without shrinking the observed field which has limited utility.

In at least one embodiment, the process continues until a threshold performance is reached. In another embodiment, the process is limited to a threshold number of iterations.

The proposed algorithm has been proved that work well on drive optimization in up to four-dimension space.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for determining read channel parameters in a data storage device, comprising:
   receiving a read channel performance function corresponding to at least three read channel performance parameters;
   selecting a plurality of vertexes in a discrete, continuous field defined by the read channel performance function;
   determining a worst vertex in the plurality of vertexes having a worst performance;
   determining if replacing the worst vertex will cause dimensional collapse; and
   determining if dimensional collapse is desirable.

2. The method of claim 1, wherein determining if dimensional collapse is desirable comprises determining if the vertexes satisfy strict dimensional constraints.

3. The method of claim 1, further comprising:
   determining a best vertex in the plurality of vertexes; and
   expanding the best vertex according to a central weight of all vertexes in the plurality of vertexes.

4. The method of claim 1, further comprising:
   determining a best vertex in the plurality of vertexes; and iteratively contracting each vertex in the plurality of vertexes with respect to the best vertex.

5. The method of claim 4, further comprising:
determining that a pre-determined number of iterations have been executed; and
halting further iterations.

6. The method of claim 4, further comprising:
logging each vertex used during each iterations; and
rejecting any new vertex previously logged.

7. The method of claim 6, further comprising selecting a neighboring vertex to the rejected vertex.

8. A data storage device comprising:
a processor;
memory connected to the processor;
a data storage element connected to the processor; and
computer executable program code to configured the processor to:
receive a read channel performance function corresponding to at least three read channel performance parameters;
select a plurality of vertexes in a discrete, continuous field defined by the read channel performance function;
determine a worst vertex in the plurality of vertexes having a worst performance;
determine if replacing the worst vertex will cause dimensional collapse; and
determine if dimensional collapse is desirable.

9. The data storage device of claim 8, wherein determining if dimensional collapse is desirable comprises determining if the vertexes satisfy strict dimensional constraints.

10. The data storage device of claim 8, wherein the computer executable program code further configures the processor to:
determine a best vertex in the plurality of vertexes; and
expand the best vertex according to a central weight of all vertexes in the plurality of vertexes.

11. The data storage device of claim 8, wherein the computer executable program code further configures the processor to:
determine a best vertex in the plurality of vertexes; and
iteratively contract each vertex in the plurality of vertexes with respect to the best vertex.

12. The data storage device of claim 11, wherein the computer executable program code further configures the processor to:
determine that a pre-determined number of iterations have been executed; and
halt further iterations.

13. The data storage device of claim 11, wherein the computer executable program code further configures the processor to:
log each vertex used during each iterations; and
reject any new vertex previously logged.

14. The data storage device of claim 13, wherein the computer executable program code further configures the processor to select a neighboring vertex to the rejected vertex.

15. A computer apparatus comprising:
a processor;
memory connected to the processor;
a data storage element connected to the processor; and
computer executable program code to configured the processor to:
receive a read channel performance function corresponding to at least three read channel performance parameters;
select a plurality of vertexes in a discrete, continuous field defined by the read channel performance function;
determine a worst vertex in the plurality of vertexes having a worst performance;
determine if replacing the worst vertex will cause dimensional collapse; and
determine if dimensional collapse is desirable.

16. The apparatus of claim 15, wherein determining if dimensional collapse is desirable comprises determining if the vertexes satisfy strict dimensional constraints.

17. The apparatus of claim 15, wherein the computer executable program code further configures the processor to:
determine a best vertex in the plurality of vertexes; and
expand the best vertex according to a central weight of all vertexes in the plurality of vertexes.

18. The apparatus of claim 15, wherein the computer executable program code further configures the processor to:
determine a best vertex in the plurality of vertexes; and
iteratively contract each vertex in the plurality of vertexes with respect to the best vertex.

19. The apparatus of claim 18, wherein the computer executable program code further configures the processor to:
determine that a pre-determined number of iterations have been executed; and
halt further iterations.

20. The apparatus of claim 18, wherein the computer executable program code further configures the processor to:
log each vertex used during each iterations; and
reject any new vertex previously logged.

* * * * *